US011706806B2

(12) United States Patent
Wang et al.

(10) Patent No.: US 11,706,806 B2
(45) Date of Patent: Jul. 18, 2023

(54) METHODS, TERMINAL DEVICES, NETWORK ELEMENTS AND APPARATUSES FOR RANDOM ACCESS PROCESS (71) Applicant: NEC CORPORATION, Tokyo (JP)

(72) Inventors: Yueyu Wang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/608,043

(22) PCT Filed: Apr. 28, 2017

(86) PCT No.: PCT/CN2017/082543
§ 371 (c)(1),
(2) Date: Oct. 24, 2019

(87) PCT Pub. No.: WO2018/195975
PCT Pub. Date: Nov. 1, 2018

(65) Prior Publication Data
US 2020/0120714 A1 Apr. 16, 2020

(51) Int. Cl.
H04W 56/00 (2009.01)
H04W 74/08 (2009.01)
(Continued)

(52) U.S. Cl.
CPC ........ H04W 74/0833 (2013.01); H04B 7/088 (2013.01); H04L 1/0003 (2013.01);
(Continued)

(58) Field of Classification Search
CPC . H04W 74/0833; H04W 16/28; H04W 74/02; H04W 80/08; H04B 7/088; H04L 1/003; H04L 27/2607
(Continued)

(56) References Cited

U.S. PATENT DOCUMENTS

2003/0026324 A1* 2/2003 Li .......................... H04W 52/50
375/141
2010/0272035 A1 10/2010 Park et al.
(Continued)

FOREIGN PATENT DOCUMENTS

CN 101588637 A 11/2009
CN 101674661 A 3/2010
(Continued)

OTHER PUBLICATIONS

"On Beam Recovery Mechanism", Guangdong OPPO Mobile Telecom, 3GPP TSG RAN WG1 Meeting #88bis, Spokane, USA, R1-1704608, Apr. 3-7, 2017, pp. 1-5.
"Discussion on beam recovery", LG Electronics, 3GPP TSG RAN WG1 Meeting #88bis, Spokane, USA, R1-1704879, Apr. 3-7, 2017, pp. 1-4.
International Search Report for PCT/CN2017/082543 dated Jan. 24, 2018 [PCT/ISA/210].
Written Opinion for PCT/CN2017/082543 dated Jan. 24, 2018 [PCT/ISA/237].
Communication dated Mar. 2, 2021, issued by the Japanese Patent Office in application No. 2019-557791.
(Continued)

Primary Examiner — Sai Ming Chan
(74) Attorney, Agent, or Firm — Sughrue Mion, PLLC (57) ABSTRACT Embodiments of the present disclosure relate to methods, terminal devices, network nodes and apparatus for random access process in a wireless network. The method at the terminal device may comprise: receiving additional information related to a terminal device together with a random access preamble. With embodiments of the present disclosure, the additional information related to a terminal device can be transmitted to the network node together with a random access preamble; in such a case, further useful information is available for the eNB, which might substantially facilitate the random access process for either initial access or non-initial access.

17 Claims, 9 Drawing Sheets (51) Int. Cl.
  *H04B 7/08* (2006.01)
  *H04L 1/00* (2006.01)
  *H04L 27/26* (2006.01)
  *H04W 16/28* (2009.01)
  *H04W 74/02* (2009.01)
  *H04W 80/08* (2009.01)

(52) U.S. Cl.
  CPC ......... *H04L 27/2607* (2013.01); *H04W 16/28* (2013.01); *H04W 74/02* (2013.01); *H04W 80/08* (2013.01)

(58) Field of Classification Search
  USPC ....................................................... 370/329
  See application file for complete search history.

(56) References Cited

U.S. PATENT DOCUMENTS

| | | | |
|---|---|---|---|
| 2013/0016705 A1 | 1/2013 | Zhang et al. | |
| 2013/0223370 A1* | 8/2013 | Larmo | H04W 8/26 370/329 |
| 2015/0156760 A1* | 6/2015 | Yu | H04W 72/042 370/329 |
| 2016/0205684 A1 | 7/2016 | Yi | |
| 2016/0249386 A1 | 8/2016 | Lyu et al. | |
| 2017/0215117 A1* | 7/2017 | Kwon | H04W 36/32 |
| 2018/0020441 A1* | 1/2018 | Lo | H04W 72/044 |

FOREIGN PATENT DOCUMENTS

| | | |
|---|---|---|
| CN | 104468433 A | 3/2015 |
| CN | 105472756 A | 4/2016 |
| CN | 106341899 A | 1/2017 |
| CN | 107925605 A | 4/2018 |
| JP | 2006-5963 A | 1/2006 |
| JP | 2010-507322 A | 3/2010 |
| JP | 2010-118883 A | 5/2010 |
| JP | 2011-109715 A | 6/2011 |
| JP | 2014-527331 A | 10/2014 |
| WO | 2009/079913 A1 | 7/2009 |
| WO | 2011/085522 A1 | 7/2011 |
| WO | 2015/144256 A1 | 10/2015 |
| WO | 2016153176 A1 | 9/2016 |
| WO | 2017030412 A1 | 2/2017 |

OTHER PUBLICATIONS

Sony, "Discussions on 2 Steps RACH Procedure", 3GPP TSG RAN WG1 Meeting AH_NR Meeting, Spokane, USA, Jan. 16-20, 2017, R1-1700668, 6 pages.
CATT, "Considerations on beam recovery mechanism", 3GPP TSG RAN WG1 Meeting #88, Athens, Greece, Feb. 13-17, 2017, R1-1702078, 5 pages.
InterDigital Communications, "2-step random access procedure", 3GPP TSG RAN WG1 AH_NR Meeting, Spokane, USA, Jan. 16-20, 2017, R1-1700703, 4 pages.
NTT Docomo, Inc., "Further views on mechanism to recover from beam failure", 3GPP TSG RAN WG1 Meeting #88bis, Spokane, USA, Apr. 3-7, 2017, R1-1705719, 6 pages.
Fujitsu, "Discussion on PRACH configuration in NR", 3GPP TSG RAN WG1 Meeting #87, Reno, USA, Nov. 14-18, 2016, R1-1611461, 5 pages.
CATT, "Further considerations on a 2-step RA Procedure", 3GPP TSG RAN WG1 AH_NR Meeting, Spokane, USA, Jan. 16-20, 2017, R1-1700186, 4 pages.
Communication dated Feb. 16, 2021, issued by the Japanese Patent Office in application No. 2019-557791.
Office Action dated Oct. 5, 2021 in Japanese Application No. 2019-557791.
CATT, "Random access procedure in NR", 3GPP TSG-RAN WG2 Meeting #96, R2-167951, Reno, USA, Nov. 14-18, 2016 (4 pages total).
Office Action dated Sep. 27, 2022 issued by the Chinese Patent Office in Chinese Application No. 201780090066.6.
Nokia et al., "Beam Management in Initial Access", 3GPP TSG-RAN WG1#87, 2016, R1-1612809, Reno, U.S.A., Nov. 14-18 (5 pages total).
ZTE Corporation et al., "Random access in NR", 3GPP TSG RAN WG2 Meeting #96, 2016, R2-167831, Reno, USA, Nov. 14-18 (9 pages total).
Office Action dated Dec. 20, 2022 in Japanese Application No. 2021-180681.
Qualcomm Incorporated, "2 step Random Access procedure in NR", 3GPP TSG-RAN WG2 Meeting NR ad-hoc, R2-1700564, Jan. 17-19, 2017, Spokane, USA (3 pages total).
Fujitsu, "Discussion on RAR in NR considering reciprocity issues", 3GPP TSG RAN WG1 Meeting #87, R1-1611462, Nov. 14-18, 2016, Reno, USA (6 pages total).

* cited by examiner

METHODS, TERMINAL DEVICES, NETWORK ELEMENTS AND APPARATUSES FOR RANDOM ACCESS PROCESS

CROSS REFERENCE TO RELATED APPLICATIONS

This application is a National Stage of International Application No. PCT/CN2017/082543 filed Apr. 28, 2017.

FIELD OF THE INVENTION

The non-limiting and exemplary embodiments of the present disclosure generally relate to the field of wireless communication techniques, and more particularly relate to a method and apparatus for random access process at a terminal device and the terminal device, a method and apparatus for random process at a network element and the network element.

BACKGROUND OF THE INVENTION

During transmission between a network node and a terminal device, beam failure might occur when the quality of beam link(s) falls below a threshold for control/data information demodulation. This might be resulted from existing of barriers, frequency drift of terminal device crystal oscillation, etc. In such a case, it requires recovering the failure beam.

Figure 1A:
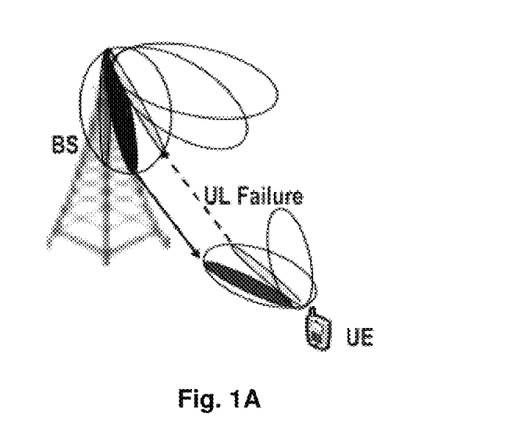
FIGS. 1A to 1C schematically illustrate three different scenarios of beam failure.
Figure 1B:
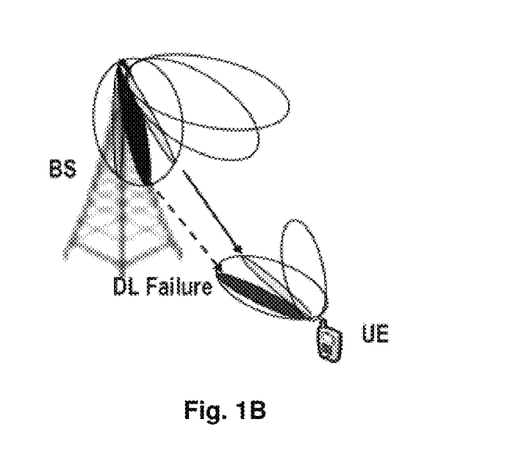
Figure 1C:
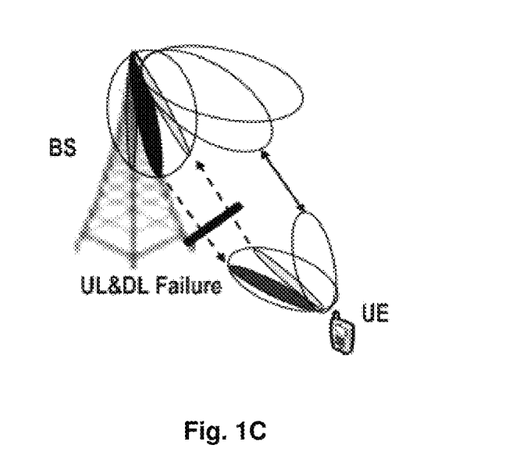

For illustrative purposes, in FIGS. 1A to 1C are illustrated three different scenarios of beam failure respectively. FIG. 1A illustrates a scenario of uplink beam failure, wherein the beam for the uplink transmission fails but the beam for downlink transmission can still work. FIG. 1B illustrates another scenario of downlink beam failure, wherein the beam for downlink transmission fails but the beam for uplink transmission can keep working. FIG. 1C illustrates a further scenario of both link failure, i.e., the uplink beam and the downlink beam fail at the same time, which might occur due to the existing of barriers. As illustrated in FIG. 1C, the beam for the uplink transmission and the beam for downlink transmission both fail and there is a possibility to reconnect with the base station BS via another link.

In Radio Access Network (RAN) 1 #88bis meeting for the third generation Partnership Project (3GPP) working group, there was an agreement that physical random access channel (PRACH)/PRACH-like can be used for beam failure recovery request transmission, e.g., different parameter for preamble sequence for PRACH.

In the 3GPP Long Term Evolution (LTE), a random access process can be used to establish or re-establish a communication connection with the network. The random access process can be performed during an initial access, handover, or uplink non-synchronization, etc. In a LTE system, the random access process includes two types, i.e., a contention based random access process and a non-contention based random access process. For illustrative purposes, FIGS. 2A and 2B illustrate two types of random access process.

Figure 2A:
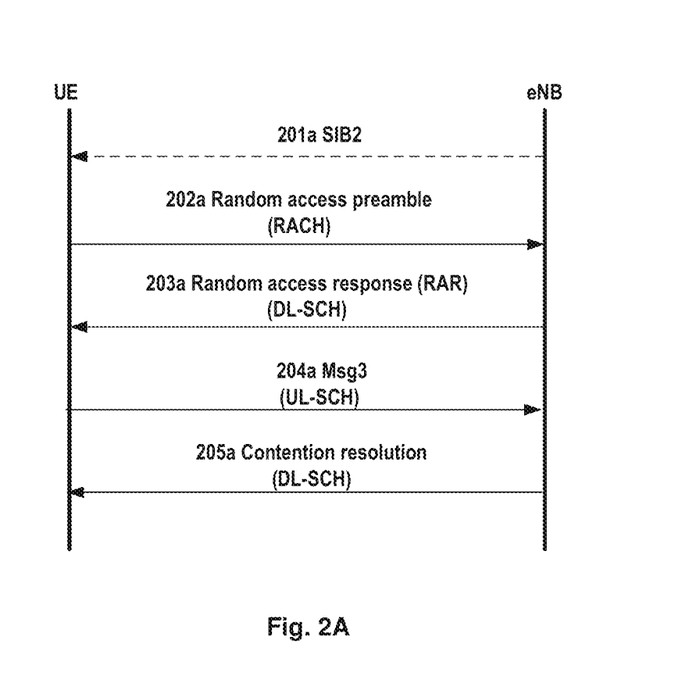
FIG. 2A schematically illustrates a flow chart of contention based random access process in the LTE system.

FIG. 2A is a signal chart of contention based random access process in the LTE system. As illustrated in FIG. 2A, in step 201a, UE receives the system information such as System Information Block 2 (SIB2) to learn the available preambles; in step 202a, the UE sends a randomly selected preamble on PRACH to the evolved node B (eNB). The eNB send a random access response (RAR) on Downlink Shared Channel (DL-SCH) and the UE sends in step 204a a message 3 (Msg3) on Uplink Shared Channel (UL-SCH) to request resource schedule. At the step 204b, the eNB sends contention resolution (CR) message to inform the terminal device of the contention results.

Figure 2B:
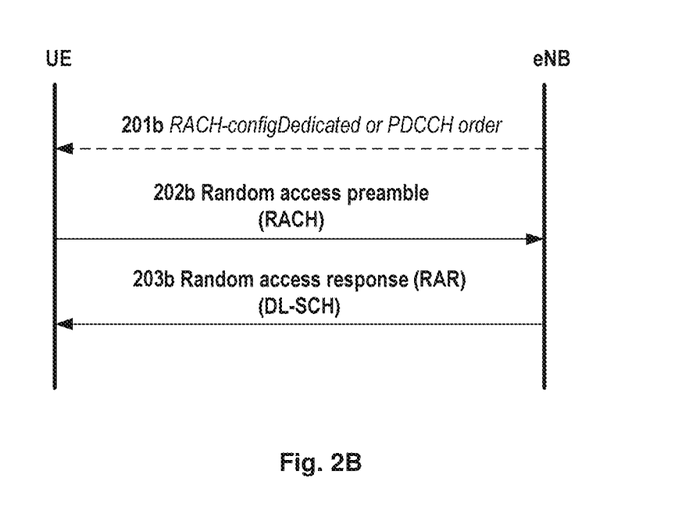
FIG. 2B schematically illustrates a flow chart of non-contention based random access process in the LTE system.

FIG. 2B illustrates a signal chart of non-contention based random access process in the LTE system. Different from the contention based random access, in step 201b, the UE receives RACH-configDedicated or physical downlink control channel (PDCCH) order, which indicates a random access preamble allocated to the UE; in step 202a, the UE sends the indicated random access preamble on PRACH to the evolved node B (eNB). The eNB identified the UE as a UE initiating a non-contention based random access process, can send a random access response (RAR) on downlink shared channel (DL-SCH) to achieve, for example, the uplink synchronization. Afterwards, the UE and the eNB can transmit on the resource previously allocated to the UE and no more other steps like Msg 3 or CR message are required.

As agreed in New Radio (NR) system, beam links can be recovered by a random access preamble of PRACH. However, for the non-contention based random access process, the number of available of preambles is limited; while for the contention based random access process, it requires more steps which mean large time latency. In addition, for initial access, there is also involved a problem, i.e., no enough uplink channel information for the network to allocate resource to the terminal device.

Thus, in the art, there is a need to improve the random access process.

SUMMARY OF THE INVENTION

To this end, in the present disclosure, there is provided a new solution for access random process, to mitigate or at least alleviate at least part of the issues in the prior art.

According to a first aspect of the present disclosure, there is provided a method of random access procedure in a wireless communication system, which can be implemented at a terminal device like UE. The method may comprise transmitting additional information related to a terminal device together with a random access preamble.

According to a second aspect of the present disclosure, there is provided a method of random access procedure in a wireless communication system, which can be implemented at a network node like eNB. The method may comprise: receiving additional information related to a terminal device together with a random access preamble.

According to a third aspect of the present disclosure, there is provided a terminal device. The terminal device may comprise a transceiver configured to transmit and/or receive signals; and a controller, configured to process received signals and/or signals to be transmitted. The transceiver and/or the controller are configured to perform operations of any of the first aspect.

According to a fourth aspect of the present disclosure, there is provided network node. The network node may comprise a transceiver configured to transmit and/or receive signals; and a controller configured to process received signals and/or signals to be transmitted. The transceiver and/or the controller are configured to perform operations of any of a second aspect.

According to a fifth aspect of the present disclosure, there is provided a terminal device. The network node may comprise a processor and a memory coupled with the processor and having program codes therein, which, when executed on the processor, cause the terminal device to perform operations of the first aspect.

According to a sixth aspect of the present disclosure, there is provided a network element. The network node may comprise a processor and a memory coupled with the processor and having program codes therein, which, when executed on the processor, cause the network node to perform operations of the second aspect.

According to a seven aspect of the present disclosure, there is provided a computer-readable storage media with computer program code embodied thereon, the computer program code configured to, when executed, cause an apparatus to perform actions in the method according to any embodiment in the first aspect.

According to an eighth aspect of the present disclosure, there is provided a computer-readable storage media with computer program code embodied thereon, the computer program code configured to, when executed, cause an apparatus to perform actions in the method according to any embodiment in the second aspect.

According to a ninth aspect of the present disclosure, there is provided a computer program product comprising a computer-readable storage media according to the seventh aspect.

According to an tenth aspect of the present disclosure, there is provided a computer program product comprising a computer-readable storage media according to the eighth aspect.

With embodiments of the present disclosure, the additional information related to a terminal device can be transmitted to the network node together with a random access preamble; in such a case, further useful information is available for the network, which might substantially facilitate the random access process for either initial access or non-initial access Particularly, in a beam failure case, it is possible to use a contention based random access process with reduced time latency by means of the addition information as a cell radio network temporary identifier (C-RNTI).

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR system), a radio header (RH), a remote radio head (RRH), a relay, or a low power node such as a femto, a pico, and so on.

As already mentioned, for the non-contention based random access process, the number of available of preambles is limited, while for the contention based random access process, it requires more steps, which mean large time latency. In addition, for initial access, there is no enough uplink channel information for network to allocate resource to UE. Thus, in the present disclosure, there is provided an improved random access process in which the additional information related to the terminal device will be transmitted to the network element like BS such as eNB, gNB, etc. By this means, further useful information is available for the eNB, which might facilitate the random access process for either initial access or beam link recovery. Hereinafter, detailed information will be made to the proposed random access process with reference with FIGS. 3 to 15.

Figure 3:
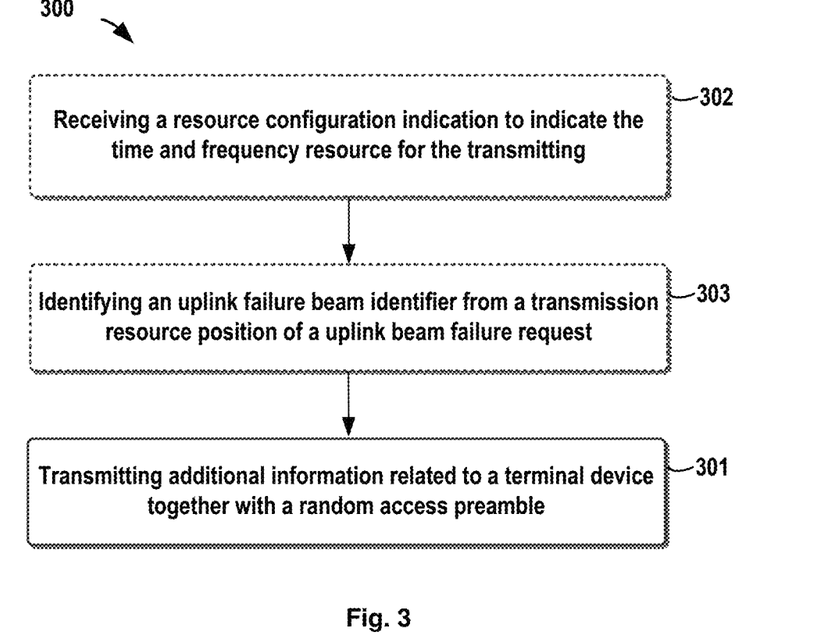
FIG. 3 schematically illustrates a flow chart of a method for random access process at a terminal device according to an embodiment of the present disclosure.

Reference is first made to FIG. 3, which schematically illustrates a flow chart of a method for random access process at a terminal device according to an embodiment of the present disclosure.

As illustrated in FIG. 3, in step 301, the terminal device transmits additional information related to a terminal device together with a random access preamble.

The addition information related to the terminal device can by any type of information related to the terminal device which can facilitate the random access process. In an embodiment of the present disclosure, the additional information further comprises an identifier of a terminal device, for example a valid cell radio network temporary identifier (C-RNTI). Additionally, or alternatively, the additional related to the terminal device may further comprise one or more of: transmission beam power; preferred modulation and coding scheme; failure beam identifier; candidate beam identifier; uplink control channel resource indication; or downlink reference signal measurement value.

In a case of beam failure, the UE has its own valid C-RNTI which is an identifier for identifying the terminal device during resource scheduling. In such a case, it is a non-initial access, and the terminal device may transmit the C-RNTI as the mandatory information to the eNB so that the eNB can use the C-RNTI to identify the terminal device. In such a case, the UE may assume a contention based random access and randomly select a preamble and send the C-RNTI together with the preamble to the eNB. Based on the C-RNTI, the eNB could know that the terminal device is still RRC-connected and thus resumes it transmission so as to recover the failure beam without requiring Msg3 or CR message.

In addition, one or more further parameter may be transmitted together with C-RNTI as optional information. As an example, further parameters may include one or more of:

transmission beam power;
preferred MCS;
failure beamID;
candidate beamIDs;
physical uplink control channel (PUCCH) resource indication;
Downlink reference signal measurement value, for example, SS-Block measurement; CSI-RS measurement; DMRS measurement.

These further parameters can be used by the eNB to facilitate the random access.

Regarding content indication, it can use any form. For example, "0" can be used to indicate failure beamID, "1" can be used to indicate transmission beam power, "2" can be used to indicate preferred MCS, "3" can be used to indicate candidate beamIDs, "4" can be used to indicate C-RNTI, etc. The order of contents can be fixed, for example, in an order of C-RNTI, failure beamID, candidate beamIDs, transmitting beam power, MCS, and etc.

For an initial access, there is no a valid C-RNTI in the UE. In such a case, for the LTE system, the additional information related with the terminal device may include one or more of:

transmission beam power;
preferred MCS.

For the NR system, the additional information related with the terminal device may comprise one or more of:

transmission beam power;
preferred MCS;
failure beamID;
candidate beamIDs;
physical uplink control channel (PUCCH) resource indication;
downlink reference signal measurement value, for example, SS-Block measurement; CSI-RS measurement; DMRS measurement.

By means of the additional information related to the terminal, it may simplify the contention access process for non-initial access, and thus minimizing time latency; for initial access, it can give more useful channel information to the network.

For non-contention access, the used preamble resource is indicated by the network explicitly. In such a case, there is no need to transmit C-RNTI to the network and in the LTR system, the additional information may include one or more of:

transmission beam power;
preferred MCS.

For the NR system, the additional information related with the terminal device may comprise one or more of:

transmission beam power;
preferred MCS;
failure beamID;
candidate beamIDs;
physical uplink control channel (PUCCH) resource indication;
downlink reference signal measurement value, for example, SS-Block measurement; CSI-RS measurement; DMRS measurement.

For a case of beam failure recovery triggered by the UE, the additional information may comprise a failure beamID as for example mandatory information. In addition, it may further include one or more following parameter as optional parameters:

transmission beam power;
preferred MCS;
failure beamID;

candidate beamIDs;
physical uplink control channel (PUCCH) resource indication;
downlink reference signal measurement value, for example, SS-Block measurement; CSI-RS measurement; DMRS measurement.

Regarding content indication and content order for the initial access, it can use any form. For example it may use a content indication and a content order similar to those in non-initial access as already mentioned hereinabove.

By means of the additional information, it may provide more useful UE information to the network, which is quite useful to the network.

The additional information can be transmitted to the eNB in any suitable manner. In an embodiment of the present disclosure, the additional information related to the terminal device can be transmitted immediately before and/or after the random access preamble in a time domain or in a frequency domain. For example, the additional information related to the terminal device can be transmitted in a guard time or a subcarrier guard band. Hereinafter, additional information transmission will be described with reference to FIGS. 4 to 10.

Figure 4:
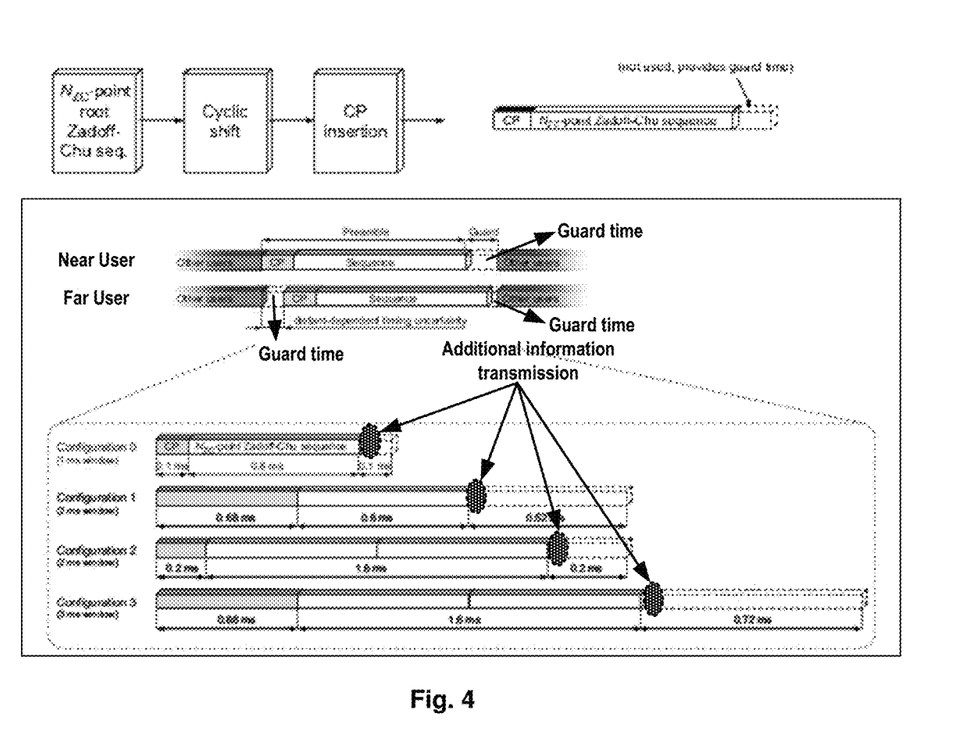
FIG. 4 schematically illustrates a general transmission solution of additional information related to a terminal device in time domain according to an embodiment of the present disclosure.

FIG. 4 schematically illustrates a general transmission solution of additional information related to a terminal device in time domain according to an embodiment of the present disclosure. In FIG. 4, the time domain transmission of the preamble is illustrated. As illustrated in FIG. 4, a preamble is first generated based on a root Zadoff-Chu sequence; then the generated sequence is cyclic shifted; next, CP is in turn inserted into the cyclic shifted sequence.

From the figure, it can be seen that following the resulting sequence, there is a guard time which is not used. For both near user and far user, there is always a guard time although the guard time for the far user has an uncertain timing which is dependent on its distance. For different preamble configurations, the timings and the duration of the guard time are different but there is enough time resource for transmitting the additional information. Thus, it is proposed to transmit the additional information by means of time resource within the guard time, as indicated by the circle with dots.

For the time domain additional information transmission, an example signal generation module can be derived as, for example:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})}$$
$$0 \le t < T_{SEQ} + T_{CP}$$
$$+ \beta_{PRACH} u(t)$$
$$T_{SEQ} + T_{CP} \le t < T_{SEQ} + T_{CP} + M$$

(Equation 1)
$0 \le t < T_{SEQ} + T_{CP} + M$ where $X_{u,v}(n)$ indicates the preamble;
$u(t)$ indicates the additional information;
$\beta_{PRACH}$ indicates an amplitude scaling for PRACH;
$T_{cp}$ indicates a cyclic prefix length;
$T_{SEQ}$ is a sequence length;
M is a symbol length of parameters;
$N_{ZC}$ is a ZC sequence length;
$K = \Delta f / \Delta f_{RA}$, wherein $\Delta f_{RA}$ indicates subcarrier and $\Delta f$ indicates subcarrier spacing;
$k_0$ indicates a preamble location in frequency domain.

Figure 5:
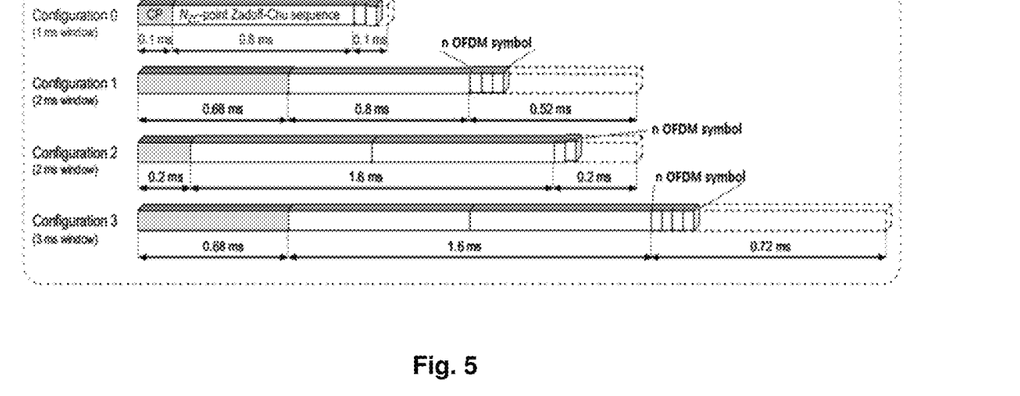
FIG. 5 schematically illustrates an example transmission solution of additional information related to a terminal device in time domain according to an embodiment of the present disclosure.

FIG. 5 schematically illustrates an example transmission solution of additional information related to a terminal device in time domain according to an embodiment of the present disclosure. The solution may be applied for preamble configurations 0 to 3 and in the solution. As illustrated in FIG. 5 the first n Orthogonal Frequency Division Multiplexing (OFDM) symbols within the guard time are used to transmit the additional information. The number n can be configurable and the OFDM symbol length can also be configurable.

For LTE preamble configuration 4, it might be different. With different uplink-downlink configurations, the length of Downlink Pilot Time Slot (DwPTS) and Uplink Pilot Time Slot (UpPTS) is different. Thus, transmission location of additional information related to the terminal device might also be different. In such a case, the additional information can be transmitted in at least one of an uplink pilot time slot following the random access preamble or a guard period close to the uplink pilot time slot for transmitting the random access preamble.

Figure 6A:
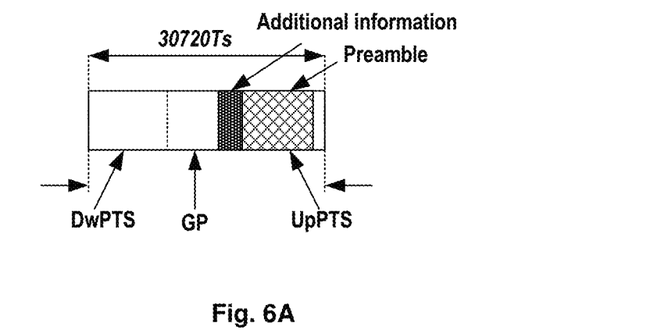
FIGS. 6A and 6B schematically illustrate another example transmission solutions of additional information related to a terminal device in time domain according to an embodiment of the present disclosure.

As illustrated in FIG. 6A, in a case that the length of UpPTS is not enough to transmit both the preamble and the additional information, the preamble can be transmitted within the UpPTS as indicated by a block with cross lines while the addition information can be transmitted within the guard period GP close to the UpPTS, as illustrated by a block with dots.

Figure 6B:
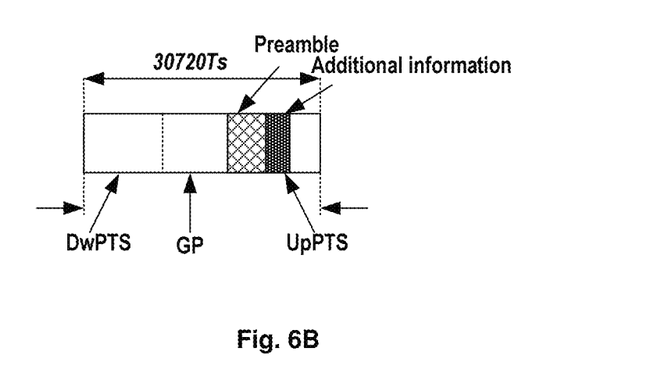

As illustrated in FIG. 6B, in a case that the length of UpPTS is enough to transmit both the preamble and the additional information, the preamble can be transmitted within the UpPTS as indicated by a block with cross lines and the additional information can be transmitted within the UpPTS following the preamble, as illustrated by a block with dots.

Next, baseband signal generation in the additional information time domain transmission solution will be further described. In an embodiment of the present disclosure, the baseband signal can use any modulation scheme, such as multiple phase shift keying (MPSK), Multiple Quadrature Amplitude Modulation (MQAM), different encoding MPSK, etc. For illustrative purposes, an example baseband signal generation for different encoding MPSK is provided as $u(t) = I(t) + jQ(t)$ $I(t+1) = I(t)\cos(\varphi_n) - Q(t)\sin(\varphi_n)$ $Q(t+1) = I(t)\sin(\varphi_n) + Q(t)\cos(\varphi_n)$ I(0), Q(0) is reference point
C-RNTI: 16 bit $C_l$, l=0, 1, ..., 15
MPSK bit map: $b_n$ n=0, 1, ..., N  N=16/Mf
$\varphi_n = b_n - b_{n-1}$
(Equations 2 to 4)

wherein I(t) indicates in-phase component of signal and Q(t) is quadrature component of signal; M indicate $2^{\wedge t}$ (t is 0, 1 ... ). In addition, please note the reference point can be the first MPSK symbol or other data.

In another embodiment of the present disclosure, it is also possible to transmit the additional information in a frequency domain immediately before or after that for the preamble, which will be described with reference to FIGS. 7 to 10.

Figure 7:
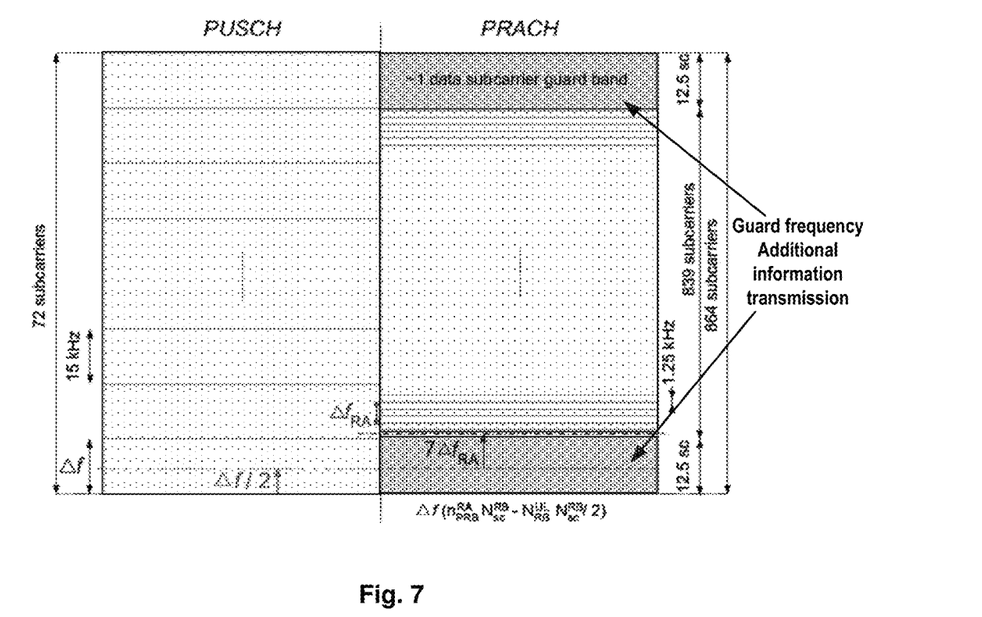
FIG. 7 schematically illustrates a general transmission solution of additional information related to a terminal device in frequency domain according to an embodiment of the present disclosure.

FIG. 7 schematically illustrates a general transmission solution of additional information related to a terminal device in frequency domain according to an embodiment of the present disclosure. In FIG. 7 is illustrated the preamble transmission in frequency domain. Form FIG. 7, it can be clearly seen that on the upside and downside of subcarriers for the preamble, there are guard frequency bands which are not used. Thus, the guard frequency band can be used to transmit the additional information related to the terminal device. It shall be appreciated that FIG. 7 illustrates a case in the LTE system and in fact, there are also provided similar guard frequency bands in the NR system, which can also be used to transmit the additional information.

Figure 8:
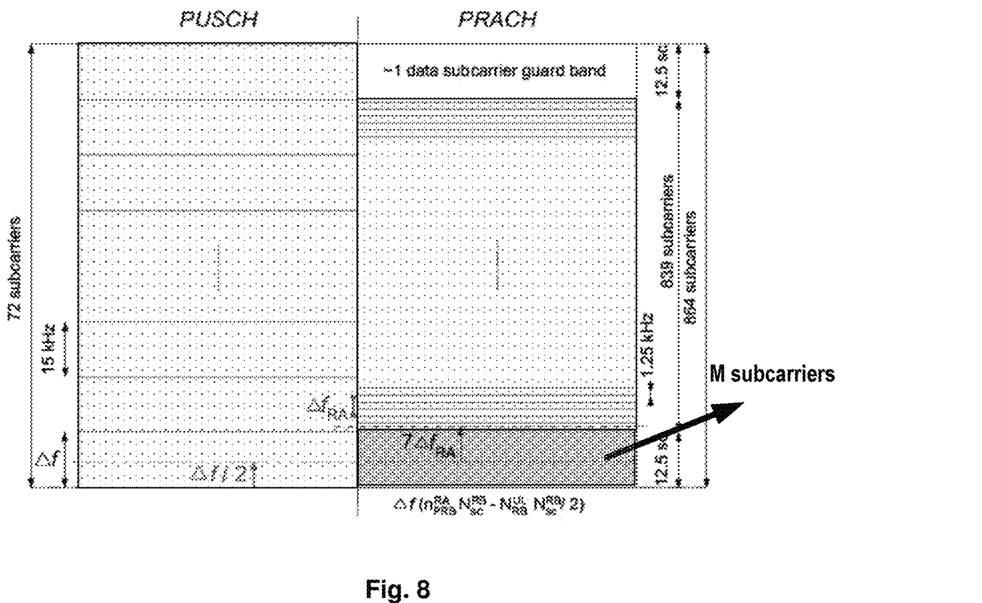
FIG. 8 schematically illustrates an example transmission solution of additional information related to a terminal device in frequency domain according to an embodiment of the present disclosure.

FIG. 8 schematically illustrates an example transmission solution of additional information related to a terminal device in frequency domain according to an embodiment of the present disclosure. In FIG. 8, M subcarriers on the downside guard band can be used to transmit the additional information related to the terminal device. In such a case, the signal generation module can be designed as for example:

(Equation 5)
$$s(t) = \beta_{PRACH}$$
$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} +$$
$$\beta_{PRACH} \sum_{k=-M}^{-1} u_k \cdot e^{j2\pi(k+\varphi+K(k_0+1/2))\Delta f_{RA}(t-T_{CP})}$$

where $X_{u,v}(n)$ indicates the preamble;
  u(k) indicates the additional information;
  $\beta_{PRACH}$ indicates an amplitude scaling for PRACH;
  $T_{cp}$ indicates a cyclic prefix length;
  M indicates the number of subcarrier for the additional information;
  $N_{ZC}$ indicates a ZC sequence length;
  $K = \Delta f/\Delta f_{RA}$, wherein $\Delta f_{RA}$ indicates subcarrier and $\Delta f$ indicates subcarrier spacing;
  $k_0$ indicates a preamble location in frequency domain.

Figure 9:
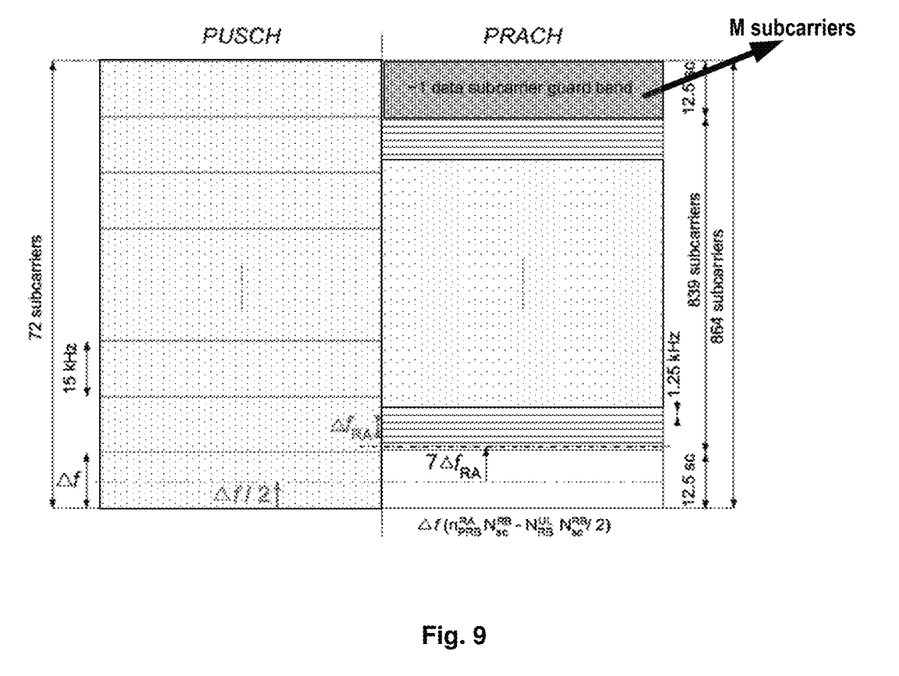
FIG. 9 schematically illustrates another example transmission solution of additional information related to a terminal device in frequency domain according to an embodiment of the present disclosure.

FIG. 9 schematically illustrates another example transmission solution of additional information related to a terminal device in frequency domain according to an embodiment of the present disclosure. In FIG. 9, the M subcarrier on the upside guard band can be used to transmit the additional information related to the terminal device. In such a case, the signal generation module can be designed as for example:

(Equation 6)
$$s(t) = \beta_{PRACH}$$
$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} +$$
$$\beta_{PRACH} \sum_{k=N_{ZC}}^{N_{ZC}+M-1} u_k \cdot e^{j2\pi(k+\varphi+K(k_0+1/2))\Delta f_{RA}(t-T_{CP})}$$

where $X_{u,v}(n)$ indicates the preamble;
  u(k) indicates the additional information;
  $\beta_{PRACH}$ indicates an amplitude scaling for PRACH;
  $T_{cp}$ indicates a cyclic prefix length;
  M indicates the number of subcarrier for the additional information;
  $N_{ZC}$ indicates a ZC sequence length;
  $K = \Delta f/\Delta f_{RA}$, wherein $\Delta f_{RA}$ indicates subcarrier and $\Delta f$ indicates subcarrier spacing;
  $k_0$ indicates a preamble location in frequency domain.

Figure 10:
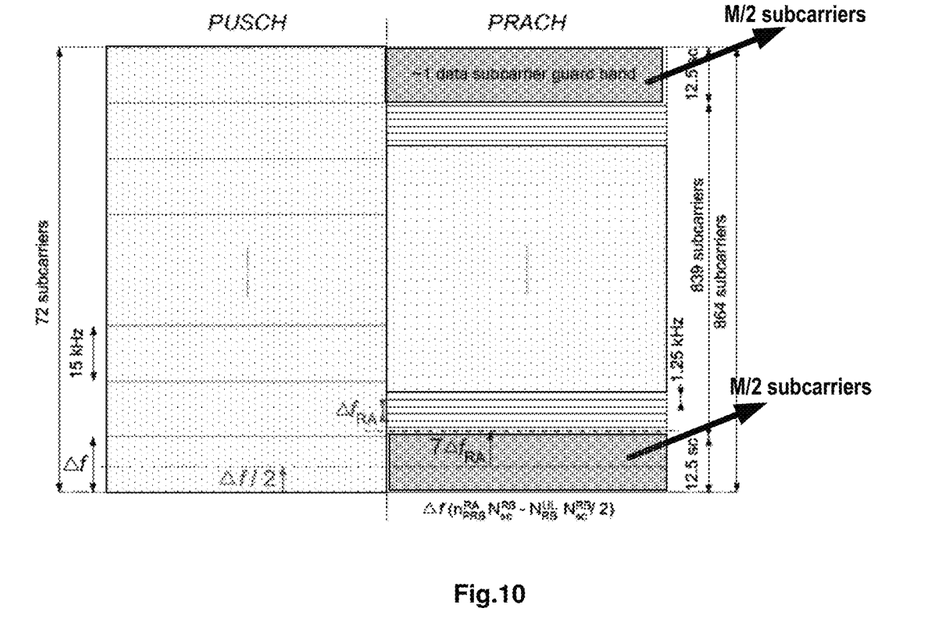
FIG. 10 schematically illustrates a further example transmission solution of additional information related to a terminal device in frequency domain according to an embodiment of the present disclosure.

FIG. 10 schematically illustrates a further example transmission solution of additional information related to a terminal device in frequency domain according to an embodiment of the present disclosure. In FIG. 10, M/2 subcarrier on the upside guard band and M/2 subcarrier on the downside guard band can be used together to transmit the additional information related to the terminal device. In such a case, the signal generation module can be designed as for example:

(Equation 7)
$$s(t) = \beta_{PRACH}$$
$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} +$$
$$\beta_{PRACH} \sum_{k=M/2}^{-1} u_k \cdot e^{j2\pi(k+\varphi+K(k_0+1/2))\Delta f_{RA}(t-T_{CP})} +$$
$$\beta_{PRACH} \sum_{k=N_{ZC}+1}^{N_{ZC}-1+M/2} u_k \cdot e^{j2\pi(k+\varphi+K(k_0+1/2))\Delta f_{RA}(t-T_{CP})}$$

where $X_{u,v}(n)$ indicates the preamble;
  u(k) indicates the additional information;
  $\beta_{PRACH}$ indicates an amplitude scaling for PRACH;
  $T_{cp}$ indicates a cyclic prefix length;
  M indicates the number of subcarrier for the additional information;
  $N_{ZC}$ indicates a ZC sequence length;
  $K = \Delta f/\Delta f_{RA}$, wherein $\Delta f_{RA}$ indicates subcarrier and $\Delta f$ indicates subcarrier spacing;
  $k_0$ indicates a preamble location in frequency domain.

Next, baseband signal generation in the additional information frequency domain transmission solution will be further described. Similarly, the baseband signal can use any modulation scheme, such as MPSK, MQAM, different encoding MPSK, etc. For illustrative purposes, an example baseband signal generation for different encoding MPSK is described.

(Equation 8)

1. C−RNTI: 16 bit $C_k$ where $k = 0, 1, \ldots, 15$

2. MPSK bit map: $b_n$ where $n = k/M$, and $M = 2^t$; $t = 0, 1, 2, \ldots$

3. $\varphi_k = b_n - b_{n-1}$ $I_k = I_{k-1}\cos(\varphi_k) - Q_{k-1}\sin(\varphi_k)$ $Q_k = I_{k-1}\sin(\varphi_k) + Q_{k-1}\cos(\varphi_k)$ $I(0), Q(0)$ is reference point, it can be anyone.

$u_k = I_k + jQ_k$ $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} +$$
$$\beta_{PRACH} \sum_{k=-M}^{-1} u_k \cdot e^{j2\pi(k+\varphi+K(k_0+1/2))\Delta f_{RA}(t-T_{CP})}.$$

wherein $I_k$ indicates in-phase component of signal and $Q_k$ is quadrature component of signal; M indicates $2^t$ (t is 0, 1 . . . ). In addition, please note the reference point can be the first MPSK symbol or other data.

Reference is made back to FIG. 3, optionally, in step 302, it may receive a resource configuration indication to indicate the time and frequency resource for the transmitting. In other words, the eNB may transmit resource configuration indication to the terminal device to configure the time and frequency resource for the transmitting the preamble and the additional information related to the terminal device. For example, the number n of OFDM symbols for the additional information related to the terminal device, and/or format of symbols which carry the additional information related to the terminal device can be configurable.

The resource configuration indication can be transmitted to the terminal device in any suitable manner. For example, it can employ the system information at cell level, physical downlink control channel at the UE level, or layer 3 UE specific signaling to transmit the resource configuration indication.

In an embodiment of the present disclosure, the resource configuration indication may be configured by system information, for example contained within Master Information Block (MIB), or Master Information Block System Information Block (SIB).

In an embodiment of the present disclosure, the resource configuration indication may include one or more of
preamble time domain position indication;
preamble frequency domain position indication;
related beam group indication;
preamble orthogonal cover code indication; or
uplink transmission resource indication for the additional information related to the terminal device.

Next, beam failure recovery request scenarios will be described in details. As is known, the beam failure includes three types, 1) uplink beam failure, 2) downlink beam failure; 3) both link failure, as illustrated in FIG. 1. For different beam failure scenarios, the beam failure can be triggered by the network or the terminal devices.

For example, in a case of uplink beam failure, the network might send a beam failure recovery request to inform the terminal device of the uplink beam failure. In such a case, the uplink beam failure recovery request can be transmitted by for example PDCCH order for recovery instantly, by Media Access Control (MAC) Control Element (CE) for an intra-cell beam failure case, or by layer 3 signaling for inter-cell beam failure case. On the other hand, in a case of downlink beam failure, the terminal device may transmit the preamble and the additional information directly; or alternatively, the additional information can be contained in the PUCCH, the UE sends the preamble, PUCCH resource indication and the additional information carried by the PUCCH to the network. The PUCCH resource indication may be located within the guard frequency band or the guard time, or other time frequency resource position. In such a case, the additional information carried by the PUCCH may include transmission beam power, UE C-RNTI, preferred MCS, failure beamID, candidate BeamIDs, etc.

In a case wherein an uplink beam failure occurs and the random access is triggered by the network, the failure beamID could be indicated implicitly. For example, a transmission resource position of uplink beam failure recovery request can be used to indicate the failure beamID implicitly. In other words, the UE may identify an uplink failure beam identifier from a transmission resource position of uplink beam failure recovery request at step 303, as illustrated in FIG. 3.

Figure 11:
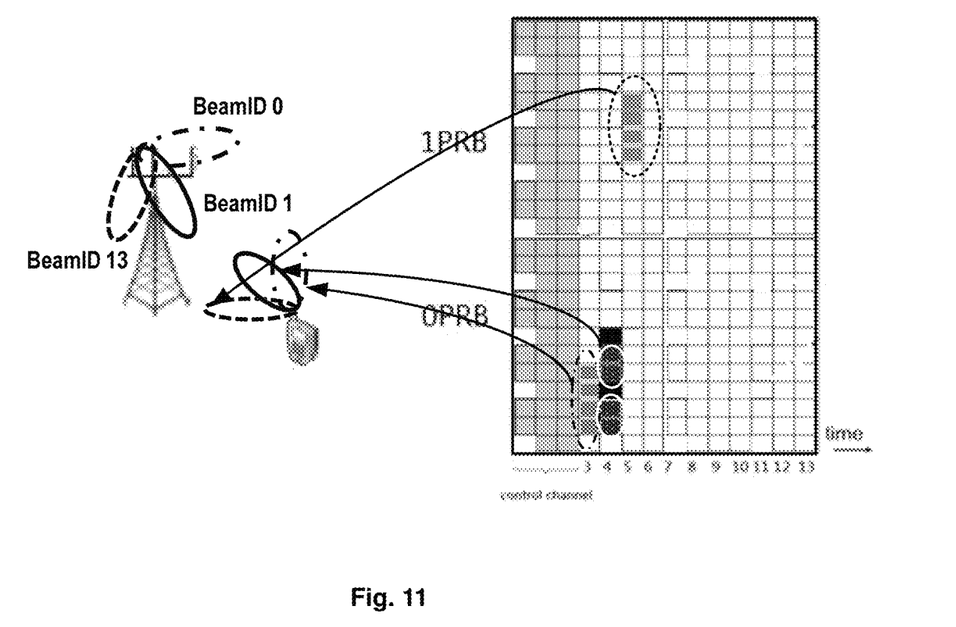
FIG. 11 schematically illustrates a beam ID indication solution according to an embodiment of the present disclosure.

In an embodiment of the present disclosure, failure beamID may be bundled with OFDM symbol number and PRB number of PDSCH which carries the trigger information, i.e., the uplink beam failure recovery request, as illustrated in FIG. 11. As illustrated, the OFDM symbol 4 and PRB 0 are used to indicate BeamID 0; the OFDM symbol 3 and PRB 0 are used to indicate BeamID 1; the OFDM symbol 5 and PRB 1 are used to indicate BeamID 13.

Hereinafter, for illustrative purposes, an example bundling is provided as follows:

$$BID = n_{PRB} * M_{symbol} + PDSCH_{symbol} + C_{symbol} \quad \text{(Equation 9)}$$

wherein $M_{symbol}$ indicates the maximum physical downlink shared channel (PDSCH) symbol number in each Transmission Time Interval (TTI) of NR;
wherein $PDSCH_{symbol}$ indicates PDSCH symbol number index, which is used to carry PDSCH;

$$PDSCH_{symbol} = \left\lfloor \frac{BID}{M_{symbol}} \right\rfloor \quad \text{(Equation 10)}$$

wherein $C_{symbol}$ indicates the maximum control symbol number in each TTI of NR;
wherein $n_{PRB}$ indicates PRB index, which is used to carry PDSCH, $$n_{PRB} = \left\lceil \frac{BID}{M_{symbol}} \right\rceil \quad \text{(Equation 11)}$$

By means of such an example bundling, the eNB can select suitable time frequency resource to indicate the failure beam ID implicitly and the UE can identify the failure beam ID.

Next, references will be made to FIG. 12 to describe the solution of random access process at a wireless communication system, which can be implemented at the network element like eNB in the LTE system or gNB in the NR system.

Figure 12:
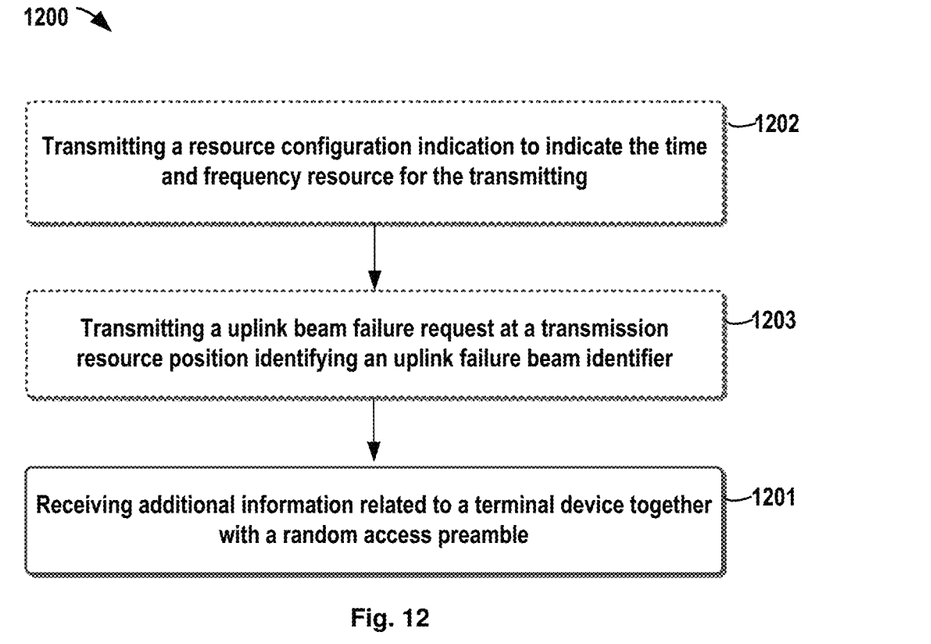
FIG. 12 schematically illustrates a flow chart of a method for random access process at a network element according to an embodiment of the present disclosure.

As illustrated in FIG. 12, in step 1201, the network receives additional information related to a terminal device together with a random access preamble. The additional information related to the terminal device can include an identifier of the terminal device. Alternatively or additionally, the additional information related to the terminal device further comprises one or more of: a valid cell radio network temporary identifier; transmission beam power; preferred modulation and coding scheme; failure beam identifier; candidate beam identifier; uplink control channel resource indication; or downlink reference signal measurement value.

In an embodiment of the present disclosure, the additional information related to the terminal device can be received immediately before and/or after the random access preamble in a time domain or in a frequency domain. Particularly, the additional information related to the terminal device can be received in a guard time or a subcarrier guard band. For example, the additional information related to the terminal device can be received in at least one of an uplink pilot time slot following the random access preamble or a guard period close to the uplink pilot time slot for transmitting the random access preamble.

Further in step 1202, the network may further transmit a resource configuration indication to indicate the time and frequency resource for transmitting of the preamble and the additional information related to the terminal device. The resource configuration indication may be received by at least one of system information, a downlink control channel, or a terminal device specific higher layer signaling. Alternatively or additionally, the resource configuration indication may include one or more of: preamble time domain position indication; preamble frequency domain position indication; related beam group indication; preamble orthogonal cover code indication; or uplink transmission resource indication for the additional information related to the terminal device.

In addition, in step 1203, the network may further comprise transmitting an uplink beam failure recovery request at a transmission resource position identifying an uplink failure beam identifier.

With embodiments of the present disclosure, the additional information related to a terminal device can be transmitted to the network node together with a random access preamble; in such a case, further useful information is available for the network, which might substantially facilitate the random access process for either initial access or non-initial access Particularly, in a beam failure case, it is possible to use a contention based random access process with reduced time latency by means of the addition information as a cell radio network temporary identifier (C-RNTI).

Figure 13:
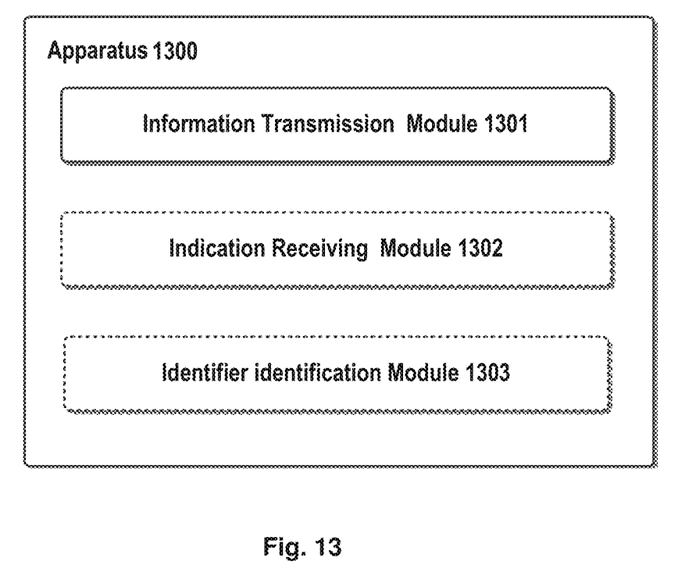
FIG. 13 schematically illustrates a block diagram of an apparatus for random access process at a terminal device according to an embodiment of the present disclosure.

FIG. 13 illustrates a block diagram of an apparatus for random access process at a terminal device according to an embodiment of the present disclosure. Apparatus 1300 can be implemented at a terminal device such as UE.

As illustrated in FIG. 13, apparatus 1300 may comprise a transmission beam information transmission module 1301. The apparatus 1300 is configured to transmit additional information related to a terminal device together with a random access preamble.

In an embodiment of the present disclosure, the additional information related to the terminal device may comprise an identifier of the terminal device.

In another embodiment of the present disclosure, the additional information related to the terminal device may further comprise one or more of: a valid cell radio network temporary identifier; transmission beam power; preferred modulation and coding scheme; failure beam identifier; candidate beam identifier; uplink control channel resource indication; or downlink reference signal measurement value.

In another embodiment of the present disclosure, the additional information related to the terminal device can be transmitted immediately before and/or after the random access preamble in a time domain or in a frequency domain.

In a further embodiment of the present disclosure, the additional information related to the terminal device can be transmitted in a guard time or a subcarrier guard band.

In a still further embodiment of the present disclosure, the additional information related to the terminal device can be transmitted in at least one of an uplink pilot time slot following the random access preamble or a guard period close to the uplink pilot time slot for transmitting the random access preamble.

In a still further embodiment of the present disclosure, the apparatus 1300 may comprise an indication receiving module 1302 which is configured to receive a resource configuration indication to indicate the time and frequency resource for the transmitting of the preamble and the additional information related to the terminal device.

In another embodiment of the present disclosure, the resource configuration indication can be transmitted by at least one of system information, a downlink control channel, or a terminal device specific higher layer signaling. Alternatively or additionally, the resource configuration indication may comprise one or more of: preamble time domain position indication; preamble frequency domain position indication; related beam group indication; preamble orthogonal cover code indication; or uplink transmission resource indication for the additional information related to the terminal device.

In a further embodiment of the present disclosure, the apparatus 1300 may further include an identifier identification module 1303, which is configured to identify an uplink failure beam identifier from a transmission resource position of an uplink beam failure recovery request.

Figure 14:
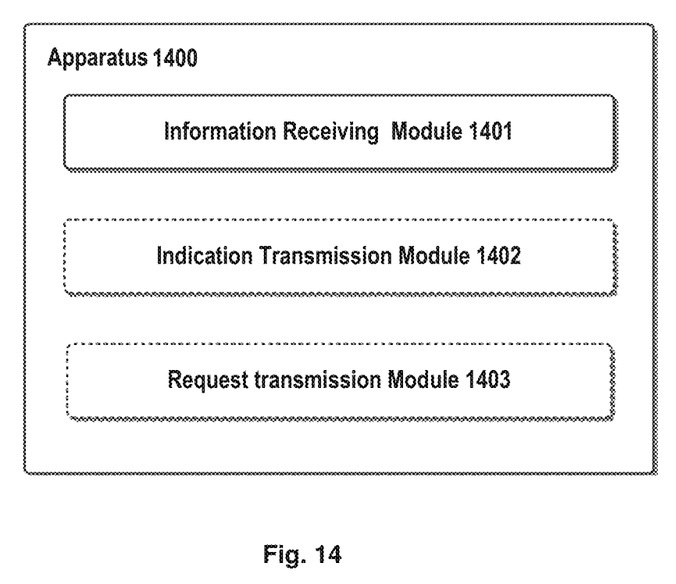
FIG. 14 schematically illustrates a block diagram of an apparatus for random access process at a network element according to an embodiment of the present disclosure.

FIG. 14 illustrates an apparatus for random access process at a wireless communication system according to an embodiment of the present disclosure. Apparatus 1400 can be implemented at a network element such as eNB or gNB.

As illustrated in FIG. 14, the apparatus 1400 includes an information receiving module 1401, which can be configured to receive additional information related to a terminal device together with a random access preamble.

In an embodiment of the present disclosure, the additional information related to the terminal device can comprise an identifier of the terminal device.

In another embodiment of the present disclosure, wherein the additional information related to the terminal device may further comprise one or more of: a valid cell radio network temporary identifier; transmission beam power; preferred modulation and coding scheme; failure beam identifier; candidate beam identifier; uplink control channel resource indication; or downlink reference signal measurement value.

In a further embodiment of the present disclosure, the additional information related to the terminal device may be received immediately before and/or after the random access preamble in a time domain or in a frequency domain.

In still further embodiment of the present disclosure, the additional information related to the terminal device is received in a guard time or a subcarrier guard band.

In yet further embodiment of the present disclosure, the additional information related to the terminal device can be received in at least one of an uplink pilot time slot following the random access preamble or a guard period close to the uplink pilot time slot for transmitting the random access preamble.

In another embodiment of the present disclosure, the apparatus 1400 may further comprise indication transmission module 1402, which is configured to transmit a resource configuration indication to indicate the time and frequency resource for transmitting of the preamble and the additional information related to the terminal device.

In a further embodiment of the present disclosure, the resource configuration indication can be received by at least one of system information, a downlink control channel, or a terminal device specific higher layer signaling. Alternatively, the resource configuration indication can comprise one or more of: preamble time domain position indication; preamble frequency domain position indication; related beam group indication; preamble orthogonal cover code indication; or uplink transmission resource indication for the additional information related to the terminal device.

In another embodiment of the present disclosure, the apparatus 1400 may further comprise request transmission module 1403, which is configured to transmit an uplink beam failure recovery request at a transmission resource position identifying an uplink failure beam identifier.

Hereinbefore, the apparatuses 1300 and 1400 are described with reference to FIGS. 13 and 14 in brief. It is noted that the apparatuses 1300 and 1400 may be configured to implement functionalities as described with reference to FIGS. 3 to 11. Therefore, for details about the operations of modules in these apparatuses, one may refer to those descriptions made with respect to the respective steps of the methods with reference to FIGS. 3 to 12.

It is further noted that components of the apparatuses 1300 and 1400 may be embodied in hardware, software, firmware, and/or any combination thereof. For example, the components of apparatuses 1300 and 1400 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1300 and 1400 may comprise at least one processor. The at least one processor suitable for use with embodiments of the present disclosure may include, by way of example, both general and special purpose processors already known or developed in the future. Apparatuses 1300 and 1400 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1300 and 1400 to at least perform operations according to the method as discussed with reference to FIGS. 3 to 11 respectively.

Figure 15:
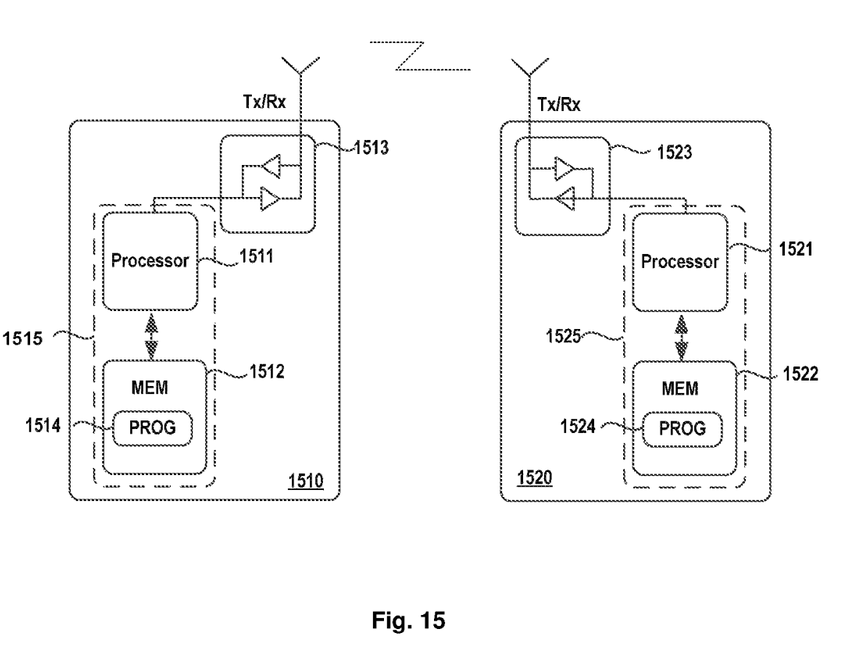
FIG. 15 further illustrates a simplified block diagram of an apparatus 1510 that may be embodied as or comprised in a network node (like eNB) in a wireless communication network, an apparatus 1520 that may be embodied as or comprised in a terminal device like UE as described herein.

FIG. 15 further illustrates a simplified block diagram of an apparatus 1510 that may be embodied as or comprised in a network node like a base station in a wireless network and an apparatus 1520 that may be embodied as or comprised in a terminal device like UE as described herein.

The apparatus 1510 comprises at least one processor 1511, such as a data processor (DP) and at least one memory (MEM) 1512 coupled to the processor 1511. The apparatus 1510 may further comprise a transmitter TX and receiver RX 1513 coupled to the processor 1511, which may be operable to communicatively connect to the apparatus 1520. The MEM 1512 stores a program (PROG) 1514. The PROG 1514 may include instructions that, when executed on the associated processor 1511, enable the apparatus 1510 to operate in accordance with embodiments of the present disclosure, for example the method 1200. A combination of the at least one processor 1511 and the at least one MEM 1512 may form processing means 1515 adapted to implement various embodiments of the present disclosure.

The apparatus 1520 comprises at least one processor 1521, such as a DP, and at least one MEM 1522 coupled to the processor 1521. The apparatus 1520 may further comprise a suitable TX/RX 1523 coupled to the processor 1521, which may be operable for wireless communication with the apparatus 1510. The MEM 1522 stores a PROG 1524. The PROG 1524 may include instructions that, when executed on the associated processor 1521, enable the apparatus 1520 to operate in accordance with the embodiments of the present disclosure, for example to perform the method 300. A combination of the at least one processor 1521 and the at least one MEM 1522 may form processing means 1525 adapted to implement various embodiments of the present disclosure.

Various embodiments of the present disclosure may be implemented by computer program executable by one or more of the processors 1511, 1521, software, firmware, hardware or in a combination thereof.

The MEMs 1512 and 1522 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1511 and 1521 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:
receiving, from a network device, a configuration information for performing a random access procedure,
wherein the configuration information comprises an indication related with a number of symbols for transmitting an uplink information; and
transmitting a random access preamble and the uplink information based on the configuration information,
wherein the random access preamble is transmitted in a physical random access channel and the uplink information is transmitted in a physical uplink channel, and
wherein the uplink information comprises a cell radio network temporary identifier (C-RNTI) and is transmitted after the random access preamble.

2. The method of claim 1, wherein the uplink information comprises an identifier of the terminal device.

3. The method of claim 1, wherein the uplink information further comprises one or more of:
a valid cell radio network temporary identifier;
a transmission beam power;
a preferred modulation and coding scheme;
a failure beam identifier;
a candidate beam identifier;
an uplink control channel resource indication; and
a downlink reference signal measurement value.

4. The method of claim 1, wherein the uplink information is transmitted in a guard time or a subcarrier guard band.

5. The method of claim 1, wherein the uplink information is transmitted in at least one of an uplink pilot time slot following the random access preamble or a guard period close to the uplink pilot time slot for transmitting the random access preamble.

6. The method of claim 1, further comprising:
receiving a resource configuration indication to indicate the time and frequency resource for the transmitting of the preamble and the uplink information.

7. The method of claim 6, wherein the resource configuration indication is transmitted by at least one of system information, a downlink control channel, or a terminal device specific higher layer signaling; and/or
wherein the resource configuration indication comprises one or more of:
a preamble time domain position indication;
a preamble frequency domain position indication;
a related beam group indication;
a preamble orthogonal cover code indication; or
an uplink transmission resource indication for the uplink information.

8. The method of claim 1, further comprising:
identifying an uplink failure beam identifier from a transmission resource position of an uplink beam failure recovery request.

9. A method comprising:
transmitting, from a network device, a configuration information for performing a random access procedure,
wherein the configuration information comprises an indication related with a number of symbols for transmitting an uplink information; and
receiving a random access preamble and the uplink information based on the configuration information,
wherein the random access preamble is received in a physical random access channel and the uplink information is received in a physical uplink channel
wherein the uplink information comprises a cell radio network temporary identifier (C-RNTI) and is received after the random access preamble.

10. The method of claim 9, wherein the uplink comprises an identifier of the terminal device.

11. The method of claim 9, wherein the uplink information further comprises one or more of:
a valid cell radio network temporary identifier;
a transmission beam power;
a preferred modulation and coding scheme;
a failure beam identifier;
a candidate beam identifier;
an uplink control channel resource indication; and
a downlink reference signal measurement value.

12. The method of claim 9, wherein the uplink information is received in a guard time or a subcarrier guard band.

13. The method of claim 9, wherein the uplink information is received in at least one of an uplink pilot time slot following the random access preamble or a guard period close to the uplink pilot time slot for transmitting the random access preamble.

14. The method of claim 9, further comprising:
transmitting a resource configuration indication to indicate the time and frequency resource for the transmitting of the preamble and the uplink information.

15. The method of claim 14, wherein the resource configuration indication is received by at least one of system information, a downlink control channel, or a terminal device specific higher layer signaling; and/or
wherein the resource configuration indication comprises one or more of:
a preamble time domain position indication;
a preamble frequency domain position indication;
a related beam group indication;
a preamble orthogonal cover code indication; or
an uplink transmission resource indication for the uplink information.

16. The method of claims 9 to 15, further comprising:
transmitting an uplink beam failure recovery request at a transmission resource position identifying an uplink failure beam identifier.

17. A terminal device, comprising:
a transceiver configured to transmit and/or receive signals; and
a controller, configured to process received signals and/or signals to be transmitted,
wherein the transceiver and/or the controller are configured to perform the method of claim 1.

* * * * *